Patented July 10, 1934

1,966,271

UNITED STATES PATENT OFFICE 1,966,271

MANUFACTURE OF GOODS OF RUBBER OR SIMILAR MATERIAL

Douglas Frank Twiss, Wylde Green, Birmingham, Albert Stanley Carpenter, Walmley, Birmingham, and Albert Edward Toney Neale, Ward End, Birmingham, England, assignors to Dunlop Tire and Rubber Corporation, Buffalo, N. Y., a corporation of New York No Drawing. Application October 12, 1933, Serial No. 693,310. In Great Britain September 29, 1932

6 Claims. (Cl. 91—68)

This invention comprises improvements in or relating to the manufacture of goods of rubber or similar material and is particularly concerned with improvements in the manufacture of rubber or similar material of sponge-like or cellular structure, having interconnecting cells and passages.

The object of the present invention is to render rubber or similar material of sponge-like or cellular structure fire-resistant.

According to this invention we provide a method of increasing the fire-resistance of cellular or porous material composed wholly or partly of rubber or the like comprising impregnating the material with a fire-preventing agent.

Examples of fire-preventing agents are ammonium salts such as ammonium sulphate, ammonium phosphate, and particularly ammonium chloride, sodium phosphates, borax, and selenium powder. These agents may be applied or introduced as a solution in a suitable solvent or as a dispersion in any convenient liquid or as a powder.

For example goods of rubber or similar material of sponge-like or cellular structure may first be impregnated with for instance a solution of ammonium chloride. Part of the liquid is then squeezed out. It has been found that the ammonium chloride or other fire-preventing substance retained after drying of the rubber increases the fire resistance in a remarkable manner. Mixtures of such agents may be applied in a similar manner.

In order to remove any tendency to dustiness, the solution of the fire-preventing agents such as of ammonium chloride, may contain a collodial binding agent such as a little casein or gelatin-glycerol or gelatin-glycol mixture.

Such colloidal material not only serves to fix the powder more firmly, but also causes the fire-preventing substance to separate from its solution in a finer state of division.

In the application of the method of the present invention to sponge or cellular rubber produced from aqueous emulsions or dispersions, it is convenient to apply the ammonium chloride or the like treatment of the vulcanized rubber goods of sponge or cellular structure before completion of the drying operations.

The sponge or cellular goods after absorption of, for instance, ammonium chloride solution, can be squeezed, drained or centrifuged and subsequently dried. Any ammonium chloride solution recovered can be used again.

The incorporation of 30% by weight of dry ammonium chloride on the rubber has been found to give satisfactory results.

As an alternative procedure in the above cases and particularly where selenium is employed, satisfactory results are also obtained by the application of the fire-preventing agent or agents in the form of powder to the surface and inside the surface apertures of the rubber or the like goods of sponge-like or cellular structure. The joint use of colloidal materials to fix the particles e. g. a solution of casein, rubber or chlorinated rubber is again advantageous.

An alternative method of application is to dissolve the selenium in a suitable liquid so as to form a solution from which the selenium is again readily liberated. For example, the selenium may be dissolved in an aqueous solution of an alkali sulphite such as potassium sulphite. This solution is then applied to the sponge in a similar manner to those described above. The selenium may also be applied in the form of a dispersion or suspension in a medium e. g. water which may contain also colloidal binding materials and other fire-preventing agents.

The following examples illustrate methods of carrying the invention into effect.

Example 1

A solution of 100 parts ammonium chloride, 6 parts ethylene glycol, and 3 parts glue in 300 parts of water is added to 3 parts of an antioxidant comprising a mixture of the condensation products of acetaldehyde with $\alpha$-and-$\beta$-napthylamines, the antioxidant being wetted with a little alcohol. Sponge rubber is soaked in this solution and the excess squeezed out until the "wet" gain in weight is 120% on the dry weight. It is dried in a current of warm air. Sponge rubber treated in this way will not burn unless held continually in a flame, and an on withdrawal from the heating flame, the sponge at once ceases to burn.

Example 2

5 parts casein are dissolved in ammonia solution, the bulk made up to 300 parts and 100 parts ammonium chloride dissolved in it. The sponge rubber is soaked in this solution and the excess squeezed out so as to leave in the sponge a quantity of solution equivalent to 120% of the weight of the dry sponge rubber. This is then dried in a current of warm air. The degree of fire-resistance can be adjusted by alterations in the proportion of ammonium chloride present.

*Example 3*

Excess selenium is boiled for 30 minutes with 20% ammonium sulphite solution and the solution obtained is filtered through glass wool. The sponge rubber is soaked in this solution and squeezed out until the increase in weight is 55% of the dry weight, and dried in a current of warm air. The selenium is slowly deposited spontaneously by exposure.

*Example 4*

Sponge rubber impregnated as in the preceding case with a solution of selenium in ammonium sulphite is exposed to an atmosphere of sulphur dioxide for liberation of the selenium. Alternatively finely powdered selenium is rubbed on to the surface and into the surface pores of sponge rubber so that some is permanently retained. The extent of fire-resistance depends upon the quantity of selenium retained.

*Example 5*

Sponge rubber soaked in a 20% solution of ammonium silico-fluoride is squeezed out until the gain in weight is 150% of the dry weight. It is dried in a current of warm air. Sponge rubber treated in this way will not burn unless heated continually in a flame, and on withdrawal from the heating flame at once ceases to burn.

*Example 6*

30 parts of finely powdered ammonium chloride are stirred into 100 parts of a 1% solution of rubber in benzene, and the suspension obtained is painted on to the surface of the sponge rubber. The solvent is allowed to evaporate and the surface is dusted with French chalk. The fire-resistance of the sponge rubber is markedly improved. A similar suspension of ammonium silico-fluoride in a benzene solution of rubber has a like effect.

It is to be understood that the quantity of fire-preventing agent remaining in the pores is not sufficient to fill the latter in any case; that the porous structure is not changed and that the agent is deposited as a superficial coating on the inner surfaces of the pores.

What we claim is—

1. A process of fireproofing sponge rubber which comprises soaking said rubber in a solution of ammonium chloride, ethylene glycol, glue and an anti-oxidant, squeezing part of said solution from said rubber, and drying the rubber.

2. A process of fireproofing sponge rubber which comprises soaking said rubber in a solution of casein and ammonium chloride, squeezing out the excess of solution, and drying the rubber.

3. A process of fireproofing sponge rubber which comprises coating said rubber superficially with a solution of rubber containing ammonium chloride and evaporating the solvent therefrom.

4. A process of fireproofing sponge rubber which comprises soaking said rubber in a solution of an ammonium salt carrying an adhesive material, squeezing part of said solution from said rubber, and drying the rubber.

5. A process of fireproofing sponge rubber which comprises soaking said rubber in a solution of a fireproofing material carrying an adhesive material, squeezing part of said solution from said rubber, and drying the rubber.

6. A process of fireproofing sponge rubber which comprises soaking said rubber in a liquid medium carrying an adhesive material and a fireproofing material, squeezing part of said liquid medium from said rubber and drying the rubber.

DOUGLAS FRANK TWISS.
ALBERT STANLEY CARPENTER.
ALBERT EDWARD TONEY NEALE.